(12) United States Patent
Pardas et al.

(10) Patent No.: US 6,990,248 B2
(45) Date of Patent: Jan. 24, 2006

(54) SEGMENTED VIDEO CODING AND DECODING METHOD AND SYSTEM

(75) Inventors: Montse Pardas, Sant Joan Despi Barcelona (ES); Philippe Salembier, Esplugas (ES); Francisco X. Ayuso, San Quirze del Vallos (ES); Eva Marti, Molins del Rey (ES)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/285,024

(22) Filed: Oct. 31, 2002

(65) Prior Publication Data

US 2003/0048955 A1    Mar. 13, 2003

Related U.S. Application Data

(62) Division of application No. 08/981,811, filed as application No. PCT/IB97/00461 on Apr. 30, 1997, now Pat. No. 6,516,093.

(30) Foreign Application Priority Data

May 6, 1996 (EP) .................................. 96400986

(51) Int. Cl.
*G06K 9/36* (2006.01)
*H04N 7/12* (2006.01)
*G06T 15/00* (2006.01)

(52) U.S. Cl. .................. 382/243; 375/240.08; 345/419

(58) Field of Classification Search ................ 382/243, 382/236, 232, 103; 375/240.08, 240.12; 345/419–423, 426; 348/699, 900
See application file for complete search history.

(56) References Cited

U.S. PATENT DOCUMENTS

5,654,771 A * 8/1997 Tekalp et al. ................ 348/699
5,982,909 A * 11/1999 Erdem et al. ................ 382/103

OTHER PUBLICATIONS

"Motion Estimation and Triangular Active Mesh," Dudon et al. France Telecom/CNET 1995, pp. 47-53.*
"Motion Compensated Video Sequence Interpolation Using Digital Image Warping," Nieweglowski et al. 1994 IEEE Internation Conference on Acoustics, Speech, and Signal Processing, vol. 5, pp. 205-208, 1994.*

* cited by examiner

*Primary Examiner*—Wenpeng Chen (57) ABSTRACT

The invention relates to a method of coding a sequence of pictures using a segment operation of each of the pictures followed by a coding operation of each of the obtained successive partitions, and to a corresponding system. The system includes a projection circuit (11), for estimating on the basis of the mesh defined for a previous picture a projected mesh made of polygons and corresponding to the current picture, a mesh coding circuit (12,13,14,15) for coding motion and texture associated to the projected mesh, and a texture error detection and coding circuit (16,17).

3 Claims, 11 Drawing Sheets

SEGMENTED VIDEO CODING AND DECODING METHOD AND SYSTEM

CROSS REFERENCE TO RELATED APPLICATIONS

This is a divisional of application Ser. No. 08/981,811, filed May 19, 2000 now U.S. Pat. No. 6,516,093.

The present invention relates to a method of coding a sequence of pictures thanks to a segmentation operation of each of said pictures followed by a coding operation of each of the obtained successive partitions, and to corresponding coding and decoding systems. This invention is particularly useful in relation with the MPEG4 standard which will play within some years a key role in the field of all multimedia applications.

In the field of very low bit rate video coding, there is an increasing interest in region-based compression methods describing each image of a sequence in terms of a set of regions (called a partition) and of some information for each region to be used by the receiver to reconstruct the image. The main difference between these techniques relates to the importance they assign to the spatial or the motion information. For instance, the article "Object-oriented analysis-synthesis coding of moving images", H. G. Musmann, M. Hötter and J. Ostermann, Signal Processing: Image Communication, vol.1, n°2, October 1989, pp.117–138, describes a coding scheme where motion plays the central role and the image is restored on the receiver side by motion compensation of past restored frames. A partition of each image is used to define the regions that should be compensated. This approach leads to good results if the sequence can actually be compensated, that is, if no new objects are allowed to be introduced in the scene and if scene changes are prohibited. As a result, this technique is mainly dedicated to very specific applications such as "head and shoulders" sequences.

Other approaches, more general, mainly deal with the spatial information of the scene. Coding algorithms combining a spatial analysis of the image sequence with a motion compensation of the transmitted information can also be proposed. On the one hand side, the spatial analysis is used to get a general scheme able to deal with any kind of sequences and scene changes. On the other hand side, motion information is used to increase the coding efficiency by compensation of the spatial information that has to be transmitted (partition and texture or color). An analysis of the results of such coding algorithms shows that about 55% of the bitstream is devoted to the partition information, about 35% to the texture (or color) and the remaining 10% to motion.

It is a first object of the invention to propose an improved coding method where much more texture information is sent to the receiver.

To this end the invention relates to a coding method such as indicated in the preamble of the description and wherein, for each current partition considered with respect to the previous one, said method comprises:

(1) an initialization step, by subdivision of said current picture into a mesh of blocks the nodes of which are located on high gradient points and of the blocks of said mesh into two triangles;

(2) a projection step, allowing to follow the time evolution of the sequence thanks to a motion estimation operation, for associating displacement vectors to the nodes of each triangle, followed by a mesh definition operation, for defining a new mesh on the basis of this motion of the nodes;

(3) a mesh motion coding step, in order to create the next partition and to define the motion field allowing to compensate the texture information, said compensation allowing to carry out a synthesis step of a prediction of the current picture, based on the knowledge of the nodes motion;

(4) a segmentation and merging step, for an adaptation of the topology of the mesh to the evolution of the scene, said segmentation sub-step allowing to introduce new triangles in the mesh and said merging sub-step allowing to remove small or degenerated triangles;

(5) a mesh update coding step.

(6) a texture error detection and coding step.

According to this method, it is proposed to work not with arbitrary shaped regions as in some previous embodiments but with simple shapes such as triangles and to send at the same time the motion and the partition information. This idea leads to the definition of an active triangular mesh coding scheme. Active meshes, studied for example in the communication "Active mesh: a feature seeking and tracking image sequence representation scheme", IEEE Transactions on Image Processing, vol.3, n°5, September 1994, pp.610–624, are generally used to model the motion information but very few complete active mesh coding schemes have been proposed. In the present description, the mesh is used to model the sequence itself and plays two fundamental roles: (a) it defines a simplified partition made of triangles (the partition is used to define homogeneous regions in terms of texture and, because of its particular structure, the partition itself can be very efficiently coded), (b) the nodes of the triangular mesh are also used to send the motion information. This means that the motion of each region is assumed to be modelled by an affine transformation and can take into account rather complex events.

It is another object of the invention to propose a corresponding coding system, for carrying out said method.

To this end the invention relates to a system for coding a sequence of segmented pictures defining successive partitions, each current picture being originally available in the form of a mesh of blocks the nodes of which are located on high gradient points and each block being subdivided into two triangles, wherein said system comprises:

(A) a projection circuit, for estimating on the basis of the mesh defined for a previous picture (T−1) a projected mesh made of polygons and corresponding to the current picture T;

(B) a mesh coding circuit, for coding motion and texture associated to said projected mesh;

(C) a texture error detection and coding circuit.

According to a first embodiment, said mesh coding circuit may comprise (a) a mesh motion coding circuit, for coding a translation vector defined for each node of the mesh;

(b) a synthesis circuit, for a prediction of the current picture based on the knowledge of the nodes motion field and a subsequent compensation of the texture information;

(c) a mesh updating circuit, for a modification of the topology of the mesh by segmentation or merging of triangles;

(d) a mesh update coding circuit, for coding the modified information related to the topology of the mesh.

According to another embodiment, said mesh coding circuit may alternatively comprise:

(a) a mesh tree definition device, for associating to said projected mesh coarser meshes obtained by merging and which define upper levels of said tree and finer meshes obtained by resegmentation and which define lower levels of said tree;

(b) a decision sub-assembly, for taking the mesh proposals of said defined mesh tree and making a decision on which polygons will belong to a so-called final projected mesh and which coding technique among a predetermined list will be used within each one of said polygons;

(c) a coding sub-assembly, for coding said decision, said final projected mesh and the texture of each of said finally selected polygons.

In the case of this second embodiment, decision sub-assembly may then comprise a decision tree construction device, said decision tree being provided for conveying information about cost and quality of said coding techniques, and an optimization device, for finding a set of polygons defining said final projected partition with the highest coding quality and the lowest associated cost.

It is still another object of the invention to propose a system for decoding signals coded by means of a coding system such as the above-described one.

To this end the invention relates to a system for decoding signals coded by means of a coding system such as described above, said coded signals constituting for each current partition a coded information corresponding to an optimal partition composed either of regions of a main partition determined by a motion estimation and compensation of a previous partition and a temporal extension of the compensated partition or of regions of additional partitions created by merging or re-segmenting regions of the main partition, wherein said decoding system comprises a decision decoding device, provided for decoding the information corresponding to the strategy used for coding said optimal partition, a motion decoding device, a partition decoding device, and a texture decoding device.

These and other aspects of the invention will be apparent from and elucidated with reference to the embodiments described hereinafter and considered in connection with the accompanying drawings, in which.

Figure 1:
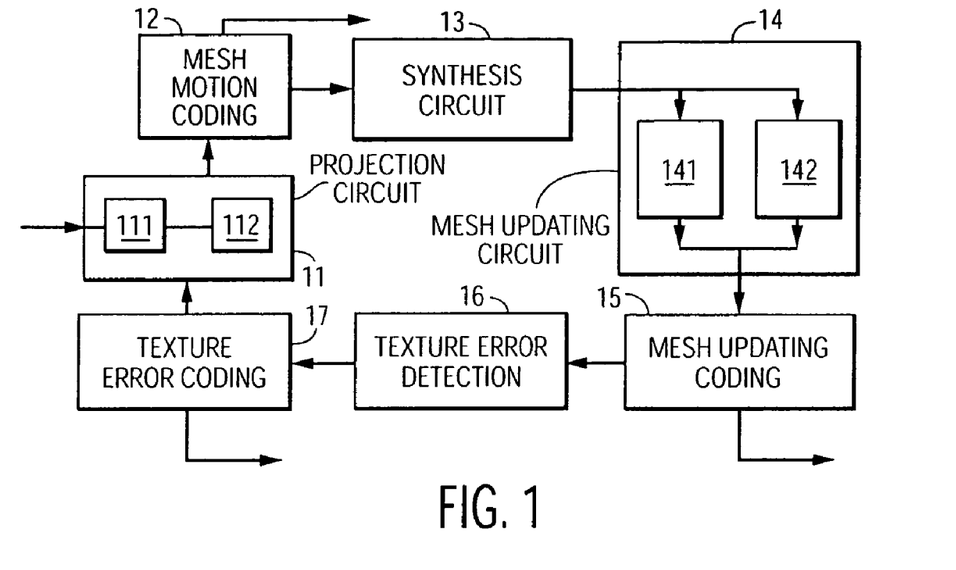
FIG. 1 shows the structure of a coding system according to the invention.

The main steps of the proposed coding method, implemented for example in a coding system such as shown in FIG. 1, are the following;

(1) projection step: this first step, provided in a projection circuit 11 in order to define the time evolution of the mesh, achieves at the same time the definition of the new partition (made of triangles) and the node motion estimation (this step does not allow the introduction of new regions);

(2) mesh motion coding step: this second step, provided in a mesh motion coding circuit 12, allows to code the information necessary to modify the mesh on the receiver side (a displacement vector for each node of the mesh);

(3) synthesis step: according to this third step provided in a synthesis circuit 13, the time evolution of each triangle is defined by the motion of its three vertices, which defines an affine motion model used to compensate the texture;

(4) mesh updating step: according to this fourth step provided in a mesh updating circuit 14, some triangles should be split (objects or strong texture inhomogeneities may have appeared) or, on the contrary, some triangles may be useless because they have a very small area or because they are extremely elongated;

(5) mesh update coding step: during this fifth step provided in a mesh update coding circuit 15, the information about the modification of the mesh topology defined by the previous mesh updating step is coded and sent to a receiver (arrow in FIG. 1);

(6) the texture within some triangles may be of poor quality: a texture error detection circuit 16 is provided (sixth step) in order to select the smallest number of triangles where the texture has to be improved;

(7) texture error coding step: the quality of the selected triangles is improved by coding their texture during this seventh step, in texture error coding circuit 17, the corresponding coded signal being sent to a receiver (arrow in FIG. 1).

Figure 2:
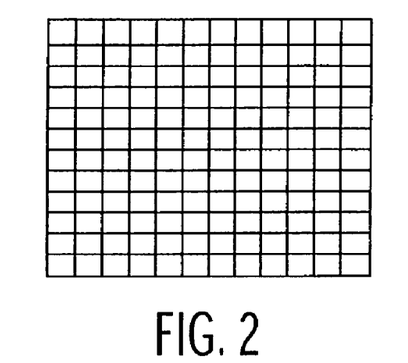
FIGS. 2 to 5 illustrate a preliminary step of initialization of the mesh.
Figure 3:
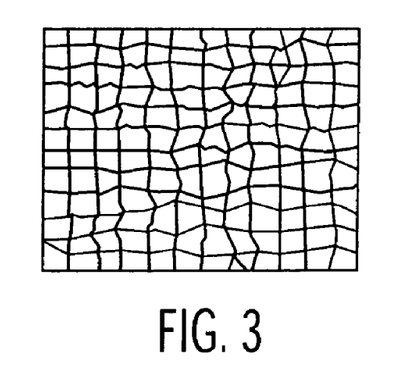
Figure 4:
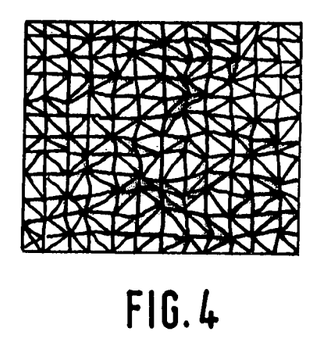
Figure 5:
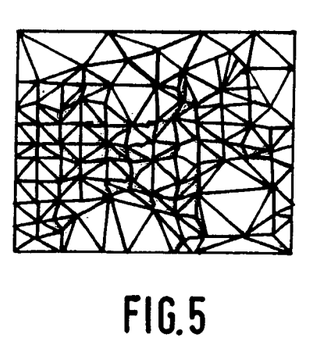

In the sequel, these various steps, as implemented in the illustrated system, are more precisely described. However a preliminary step is provided in order to define a mesh that is adapted to the image content (=mesh initialization). Such a definition of the mesh for the first frame is illustrated in FIGS. 2 to 5 (for sake of clarity, the picture itself is not shown behind the mesh). The initial mesh is a block mesh, for example a regular square mesh as shown in FIG. 2. The nodes of this initial mesh are then displaced (see FIG. 3) to be located on high gradient points, thanks to a simple search algorithm similar to a block matching algorithm working on the morphological gradient of the image. Then, each resulting polygon is transformed into two triangles (see FIG. 4). Since the polygons have four nodes, there are two possible ways of splitting them into two triangles: the splitting leading to the lowest variance within each resulting triangle is selected. Finally, nodes are removed in non-active areas of the image, which gives the mesh shown in FIG. 5. This procedure breaks the triangular structure of the mesh, which has to be restored by a triangulation algorithm (for example a Delaunay triangulation). The obtained mesh is matched to the frame to code: the density of triangles depends on the signal activity, and the edges of the mesh follow the strong gradients of the image.

The objective of the projection step (first step) being to follow the time evolution of the sequence, the projection circuit 11 is divided into a motion estimation stage 111 and a mesh definition stage 112.

In the first stage 111, the motion of each node is estimated by a block matching. The search area can be rather large because the estimation only involves a small amount of nodes (typically 100). A certainty criterion has been used to validate the estimation: if the displaced frame difference (DFD) at the optimal position is not significantly lower than the mean of the DFD for all positions of the search area, then the estimation is discarded and a zero motion is assumed.

In the second stage 112, once the displacement vectors of the nodes have been computed (stage 111), the new mesh should be defined on the basis of this motion of the set of nodes. It must be noted that the procedure is not straight-forward because if all nodes are displaced accordingly to the estimated vectors, the resulting structure may not be a triangular mesh. For example, one has to prevent one vertex of a triangle to cross the opposite edge of the triangle.

The translation vector defined for each node of the mesh in the first estimation stage 111 of the projection circuit has to be coded (second step) and sent to the receiver in order to create the new mesh (that is the next partition). In the same time, this translation vector is also used to define the motion field intended to compensate (third step) the texture information. This compensation of the image (in the synthesis circuit 13) allows to make a prediction of the current frame based on the knowledge of the nodes motion. As mentioned, the nodes motion allows a restoration of a dense motion field within each triangle. Indeed, the time evolution of each triangle is characterized by the displacement of its three nodes. This defines a geometrical affine transformation with six independent parameters.

Figure 6:
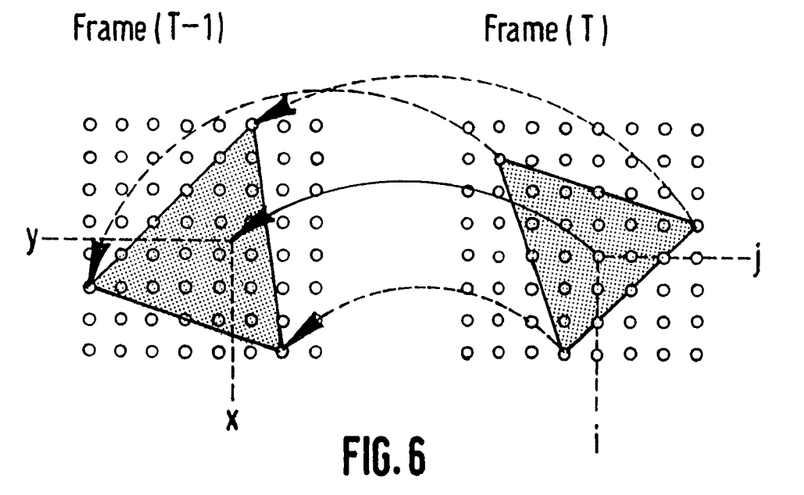
FIG. 6 shows how the texture is synthesized.

Said compensation is performed in a backward mode, as illustrated in FIG. 6. Each pixel (i,j) of a triangle of frame (T) is transformed into the pixel (x,y) of frame (T−1). Since the coordinates (x,y) are generally real values, a bilinear interpolation is used to define the gray level value that will be assigned to the pixel (i,j). The mode of compensation, that is backward in the sense that the values of pixels of frame (T) are defined by computing the values at pixels location of frame (T−1), offers the advantage of assigning one value to each pixel of frame (T).

In order to efficiently code the sequence over a large number of frames, the nodes of the mesh should follow the evolution of the scene, but the topology of the mesh should also be modified (fourth step). Indeed, because of the modifications of the scene content, new triangles may be necessary and should be introduced, or, on the contrary, some triangles may degenerate and should be removed. This is the purpose of the segmentation and merging sub-steps, carried out in segmentation and merging stages 141 and 142 now described.

Figure 7:
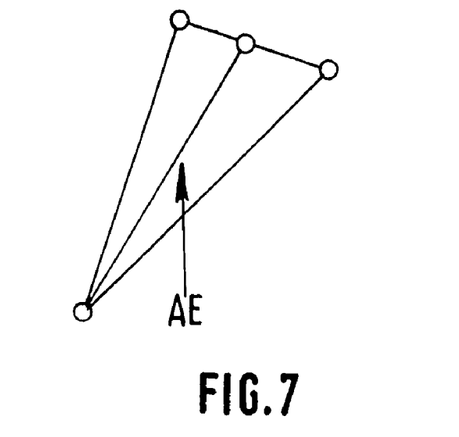
FIGS. 7 to 9 illustrate three splitting strategies for the segmentation of triangles.
Figure 8:
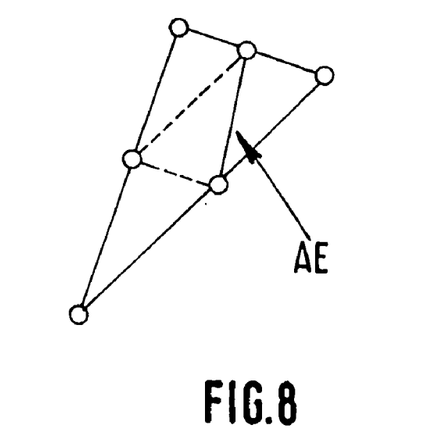

In the segmentation stage 141, one wants to introduce new triangles in the mesh in order to more accurately represent the texture or the motion. In order to select the triangles that have to be segmented, two different criteria may be used. According to the first one, a triangle should be split in such a way that one new edge will follow the high gradient (=gradient criterion) if a high gradient component of the signal crosses one edge of this triangle. It is the situation illustrated in FIG. 7 or in FIG. 8, in which the additional edge AE corresponds to about 50% of high gradient points.

Figure 9:
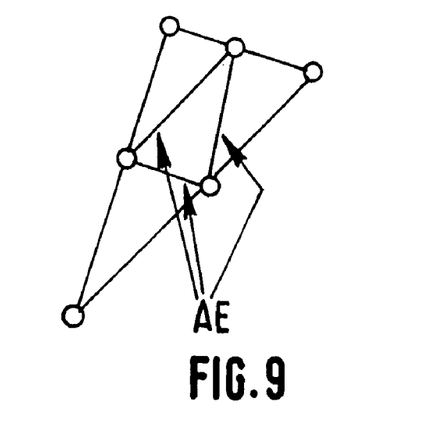
Figure 10:
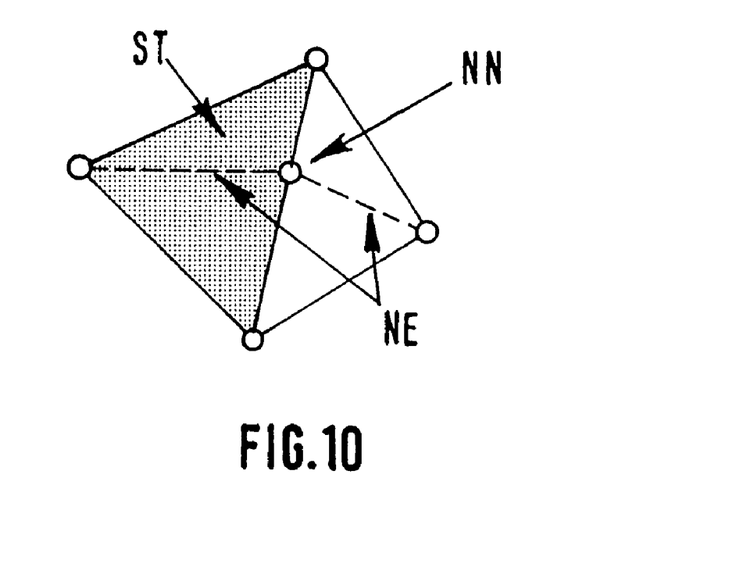
FIG. 10 illustrates the restrictive conditions of creation of new edges.

According to the second criterion, a triangle of very large size (situation of FIG. 9: with three additional edges AE) should be segmented into smaller triangles since it is likely to produce large synthesis errors (= geometrical criterion). These splitting strategies either segment the original triangles into two or four smaller triangles. The analysis of the system behaviour has shown that new nodes should generally not be introduced in the inside of the triangle because they will create a large number of useless triangles. In the present scheme, the new nodes, if any, are always located on existing edges and on high gradient positions, as shown in FIG. 10. When a new node NN has been introduced to split one triangle, several new edges NE should be created to preserve the mesh structure (all polygons of the mesh should have only three vertices).

Figure 11:
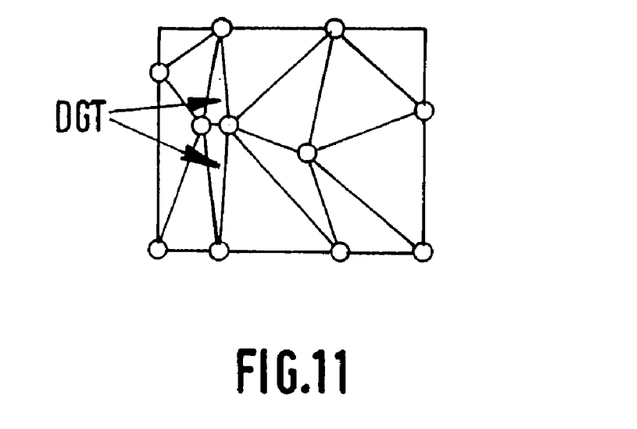
FIGS. 11 to 13 show how a process of node elimination may destroy the mesh topology.
Figure 12:
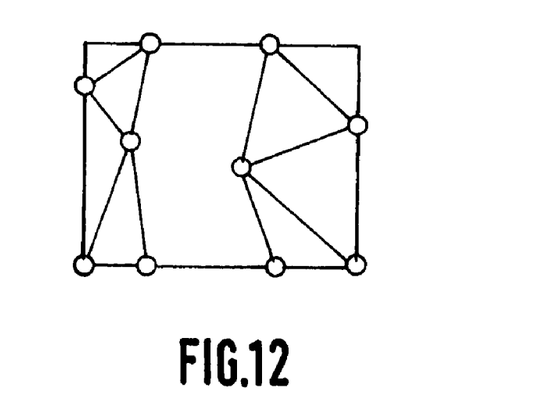
Figures 13, 14:
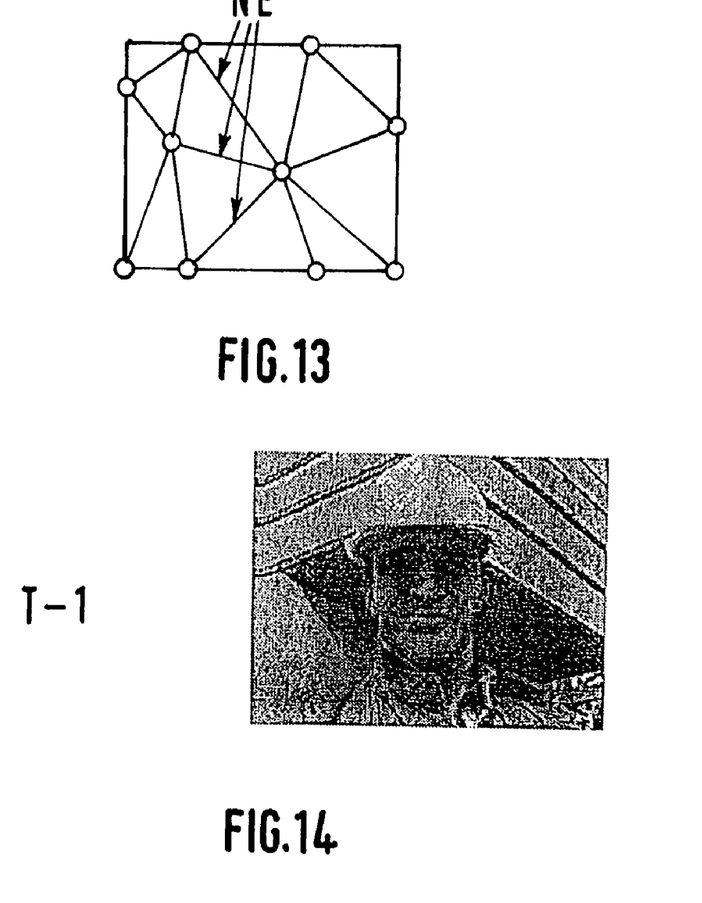
FIGS. 14 to 18 illustrate a case of texture coding corresponding to a situation where the texture synthesis has produced a poor representation of the image.

In the merging stage 142, a node elimination is provided, as illustrated in FIGS. 11 to 13. Such an elimination is used to remove triangles that are either very small or degenerated, that is triangles with one edge of size much smaller than the two others. In FIG. 11 (initial mesh), two degenerated triangles DGT can be seen. For each small or degenerated triangle, the node corresponding to the smallest gradient is removed (node extraction illustrated in FIG. 12). This node extraction destroys the mesh topology as can be seen in the center of FIG. 12. Therefore, a triangulation algorithm has to be implemented (FIG. 13), in order to add new edges NE and restore the triangular topology of the mesh.

The information about the node introduction (segmentation sub-step) or extraction (merging sub-step) is sent to the receiver (fifth step). This information can be efficiently coded: in the case of node introduction, the new node is located on an existing edge, which limits strongly the entropy of the corresponding information. For the node elimination, one has simply to indicate which nodes are removed since the triangulation algorithm is purely geometrical and can be performed on the receiver side.

Figure 15:
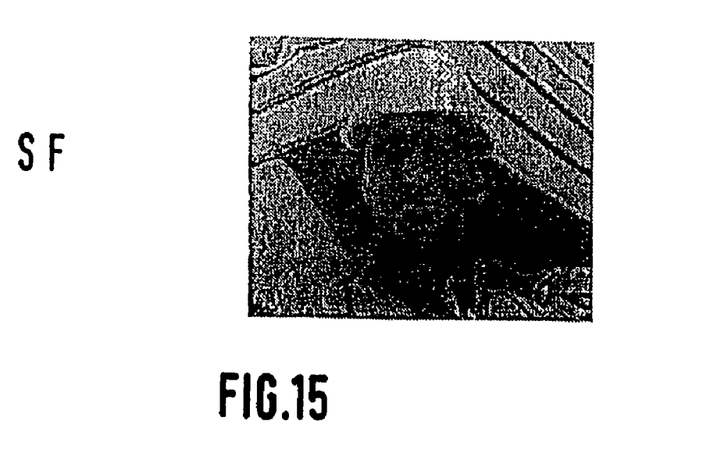
Figure 16:
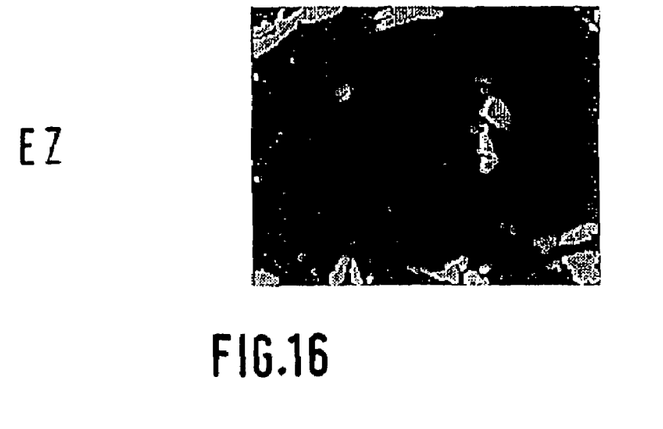
Figure 17:
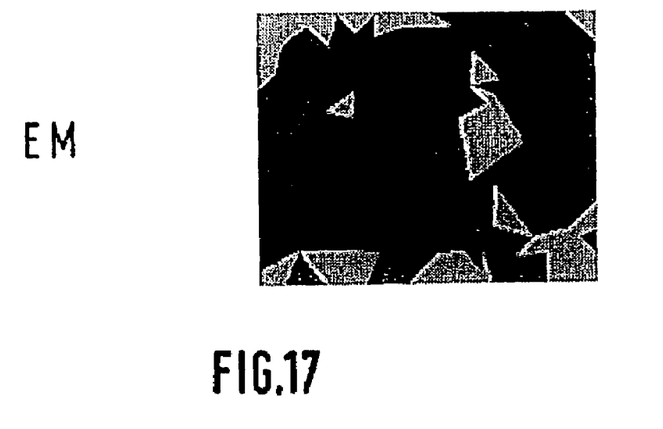
Figure 18:
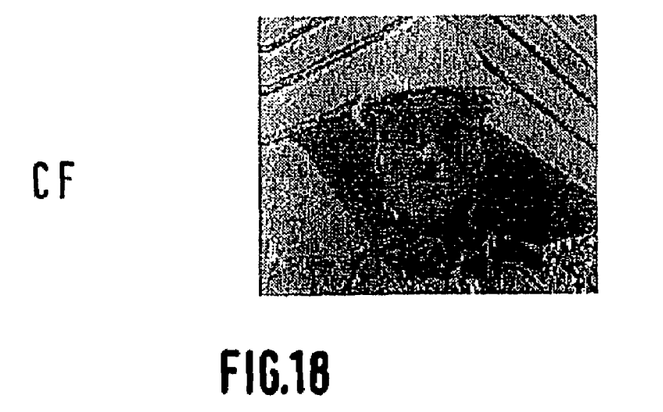

The texture coding then proposed involves the detection of areas where the synthesis has produced a poor representation of the image (FIGS. 14 and 15 respectively show an example of previous frame at time (T−1) and a corresponding synthesized frame (SF). To this end, the difference between said synthesized frame and the original current frame is computed and analyzed (sixth step) in order to extract a mask indicating where the texture has to be improved. Zones of high error (EZ) are shown in FIG. 16, and the corresponding error mask (EM) in FIG. 17. The obtained coded frame (CF) is finally shown in FIG. 18. The texture coding itself (seventh step) is carried out by means of a conventional region-based texture coding technique (coding circuit 17).

The described coding approach gives promising results compared to classical region-based coding schemes because it very efficiently deals with the motion and partition information, which allows a significant saving of bits that can be used for texture coding. This active mesh scheme actually allows the coding of the shape and motion information at a reduced cost and the analysis of the bitstreams reveals that more than 80% of the bits are devoted to texture coding, with a sequence quality better than the results obtained up to now.

It may nevertheless be contemplated to further improve these results by reducing the number of bits devoted to the partition. In the PCT patent application filed with the reference PCT/IB96/01135, it has been described, in order to reduce the number of regions to be processed (that is to be compensated), a spatio-temporal segmentation where some regions are homogeneous in motion and others are homogeneous in gray level: to efficiently define this type of segmentation, a careful analysis of the bit allocation problem had then been done, and the corresponding scheme, proposing the concept of partition tree in order to relate the partitions of the successive frames and to track regions in time, had given interesting results (for each current partition an optimal partition including regions from the different levels of the partition tree is defined, and a set of distinct coding techniques is used for the regions of said optimal partition), at least for bit rates greater than a value of about 30 kbits/s.

For very low bit rates (below 30 kbits/s), this partition coding technique begins to be too expensive in terms of bits, with a tendency to merge regions. However by taking into account the main advantage of the solution described in this european patent application (consisting in the fact that an optimization in the rate-distortion sense of the partition and of the coding strategy provides an optimum bit allocation) and combining such a characteristic to the fact that active meshes such as used in the previously described technical solution very efficiently handle a partition information, an optimum active mesh coding scheme can be proposed.

Figure 19:
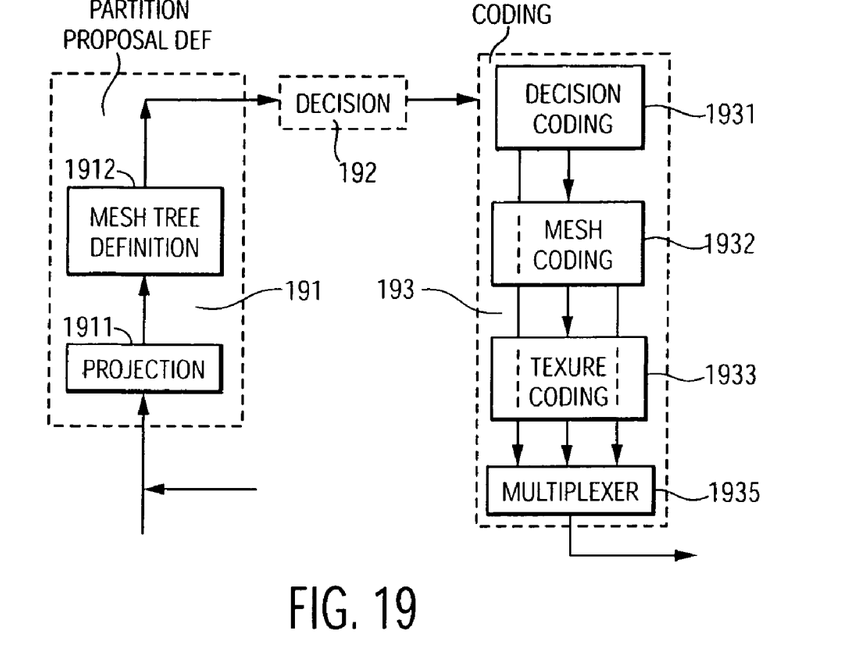
FIG. 19 shows another embodiment of an active triangular mesh coding scheme according to the invention.

The main processing sub-assemblies of this adapted coding scheme are described in FIG. 19. Three sub-assemblies 191 to 193 are provided in cascade: a first partition proposal definition sub-assembly 191, a decision sub-assembly 192, and a coding sub-assembly 193. The sub-assembly 191 is devoted to the definition of a number of partitions, from which the partition to be coded is selected by the decision sub-assembly 192, together with the coding tools appropriated for every polygonal mesh in the selected partition. The coding sub-assembly 193 then codes all the information that will be necessary for synthesizing the images at the receiver end.

The first sub-assembly 191 comprises a first projection device 1911 and a second mesh tree definition device 1912. The projection device 1911, provided for defining the time evolution of the mesh, tracks regions in time: based on the mesh defined for the previous frame (T−1), this device makes an estimation of the mesh corresponding to frame T, by means of a definition of the motion of each node of the mesh as previously indicated in the description (in the projection circuit 11). The mesh topology (number of polygons, adjacency relationship) is not modified in this device. The mesh tree definition device 1912 allows to obtain a mesh tree that is the equivalent of a partition tree but for polygonal meshes and not for arbitrary regions.

A partition tree, described for instance in the already cited PCT patent application, is built for providing, generally on the basis of motion and texture criteria, different partitions from the single projected one, in order to later select for coding the picture the most convenient regions (in the present case, the most convenient polygons). Said convenient regions constitute a final partition composed of regions issued of the different levels of the mesh tree. The intra building process of this mesh tree is based on the creation (from the projected partition) of two different kinds of partitions, on the one hand coarser ones which are created by merging regions from the projected partition and which define the upper levels of the tree (this merging process allows to obtain greater regions grouping neighbouring ones that satisfy a given criterion, for instance that have a similar motion), and on the other hand finer ones which are created by re-segmenting the projected partition and which define the lower levels of the tree (this re-segmenting process is useful, since either new objects may have appeared into the scene or two regions characterized by a different texture and however merged because they have for instance a similar motion in a previous frame may suddenly differ in their motion in the current frame).

Figure 20:
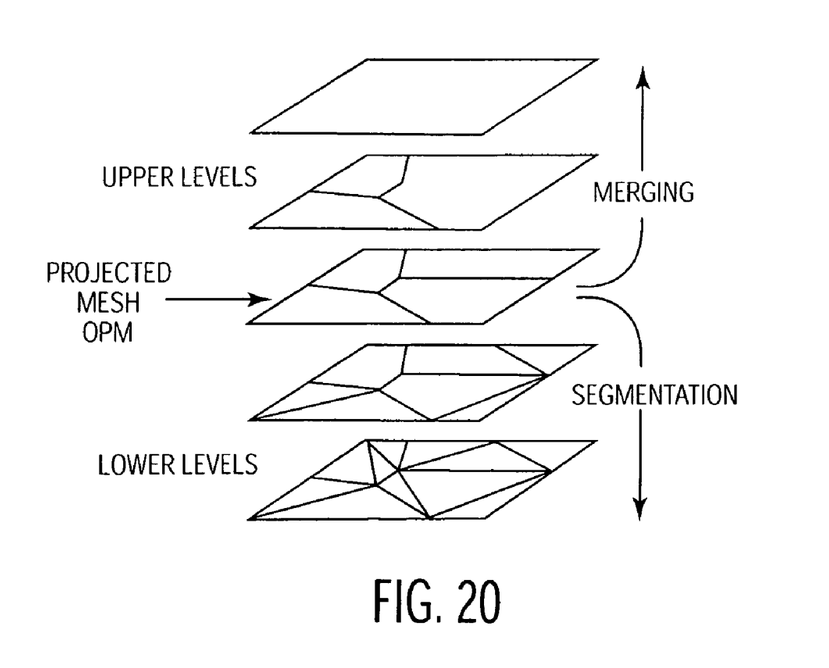
FIG. 20 illustrates the construction of a set of mesh proposals in the form of a mesh tree.

The final objective of said mesh tree is to construct a set of mesh proposals from the original projected mesh OPM, as shown in FIG. 20, where the upper levels are obtained by merging and the lower levels by re-segmentation. These mesh proposals define a reduced set of polygons that are candidate to belong to a so-called final projected mesh. The mesh tree is a hierarchical set of meshes. This means that if one node or one edge is present at a given level, this node or edge is also present on lower levels. As shown, the mesh tree is made of two parts: (a) below the projected mesh (the mesh resulting from the projection), a set of finer meshes can be found, that involve smaller polygons able to represent finer details of the image (b) above the projection mesh, a set of coarser meshes can be found: the polygons are constructed by merging some polygons of lower levels, and represent large regions that can be processed as a single one. This structure has been selected because, if the scene content has not been strongly modified, the final projected mesh should be a good approximation of the optimal mesh. With this mesh tree, it is proposed to the decision sub-assembly 192 a set of partitions that are fluctuations from the projected mesh. The decision will therefore remove or add some regions with respect to the projected mesh and will allow to define said final projected mesh.

The decision sub-assembly 192 takes the proposals from the mesh tree and makes a decision on which polygons will belong to said final projected mesh, and which coding technique will be used within each region of this final mesh, made of polygons coming from various levels of the mesh tree (for each region, several coding techniques are proposed to the decision).

The decision process, based on an optimization according to a rate-distortion criterion and illustrated in FIG. 21, relies on the concept of decision tree DT, said tree DT listing in a compact and hierarchical structure all the possible coding choices: the mesh tree MT defines the choices in term of regions (here, the polygons), while the list of coding techniques deals with the actual coding of these polygons (as explained in the following paragraph).

As already indicated in the cited PCT patent application, this decision process includes two operations consisting in a first decision tree definition operation followed by a second optimization operation. The first operation is the decision tree construction. As also illustrated in FIG. 22, from the mesh tree MT which was defining the choices in terms of regions (polygons), a decision tree DT, concentrating in a hierarchical structure all the possible coding choices, is deduced in the following way: each node of the decision tree corresponds to a polygon in the mesh tree, with relations between nodes (between father nodes and children nodes) which are also given by the mesh tree. These relations define how one region at a given level (in FIG. 22, five levels including the level of the original projected mesh OPM are shown) may either be split into various regions (or children regions) or be merged to form a larger region (or father region). Moreover, in order to define the coding strategy (in a rate-distortion sense), the decision tree will convey information about coding costs and respective quality (or distortion) of the n possible texture coding techniques: a list of rates (rate list $R_1, R_2, \ldots, R_n$) and a list of distortions (dist list $D_1, D_2, \ldots, D_n$) will therefore be assigned to each of said nodes, both lists having the same length as the list of texture coding techniques TCT, and each of these n techniques being in FIGS. 21 and 22 designated in a short manner by C1, C2, ..., ..., Cn. In practice, each polygonal region of the mesh tree is coded (either in intra or in inter mode since the motion of each region has been estimated during the creation of the mesh tree) by all the proposed techniques, and the corresponding rate and distortion are stored in the decision tree.

Figure 23:
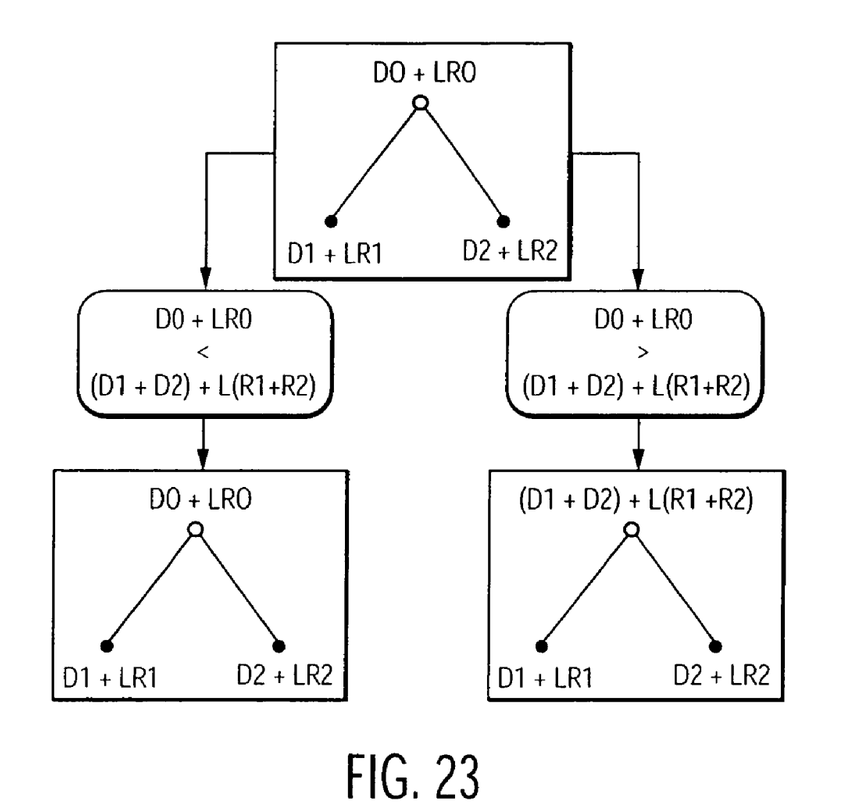
FIG. 23 illustrates how local decisions on the coding strategy are taken.

This step of construction of the decision tree is an operation of evaluation of the respective merits of each technique, no decision being taken at that moment. Once all the nodes of the decision tree have been populated with the lists of computed rates and distortions, the actual optimization operation can start. This problem of optimization can be formulated as the search for a minimization of the distortion D of the image, with the restriction that the total cost $R_t$ must be below a given budget defined for each frame, which can be reformulated as the minimization of the Lagrangian $D+LR_t$ where L is the so-called Lagrange parameter (both formulated problems have the same solution if one finds $L_o$ such that $R_t$ is equal or very close to the budget). This problem finally consists in using the decision tree in order to find a set of polygonal regions (creating a partition) and a set of texture coding techniques minimizing $D+L_o R_t$. To this end, the optimization operation comprises the following sub-steps:

a first sub-step allows to make a local analysis and to compute, for each node of the decision tree, the Lagrangian for each texture coding technique: the technique giving the lowest one is considered as the optimum one for this node and this Lagrangian is stored;

a second sub-step allows to define the best partition by a bottom-up analysis of the decision tree which, starting from the lowest level, leads to a set of local decisions on the coding strategy, as illustrated in FIG. 23: assuming that the two nodes on said lower level are active (which means that they are considered as being part of the final partition: such nodes are represented by black circles), two situations may occur when one likes to know if it is not better to code the area represented by these two regions as a single region represented by the single node located on the upper level:

(a) if the Lagrangian of the upper node ($D_o+LR_o$) is lower than the sum of the Lagrangians of the lower level, it is actually better to code the area as a single region, and the upper node becomes active in place of the two lower nodes which are deactivated (left side of FIG. 23);

(b) if the Lagrangian of the upper node is higher than said sum, it is better to code the area as two regions, and the upper node remains deactivated (right side of FIG. 23) while its new Lagrangian is the sum of the Lagrangians of the nodes at the lower level (it may be recalled that the additivity in rate and distortion has been assumed during the whole optimization operation).

This procedure is iterated until the highest level of the decision tree is reached. The set of activated nodes then gives the final set of polygonal regions which defines the optimal partition. If the coding cost, computed by adding the rates of the best techniques for all activated nodes, is equal or very close to the budget, the optimization procedure is finished and this optimal partition will be coded. If the coding cost is much below or above the budget, the Lagrange parameter L has to be modified and the optimization has to be done again. The convenient definition of L can be done with a gradient search algorithm starting with a very high value $L_H$ and a very low value $L_L$ leading to two corresponding coding strategies which give rates $R_L$ and $R_H$ respectively below and above the budget. Except if one of these rates is already close enough to the budget, a new Lagrange parameter is defined as $L=(D_H-D_L)/(R_H-R_L)$ and the procedure is iterated until one strategy giving a rate close to the budget is found (for instance falling within an interval of 5% around it).

Figure 21:
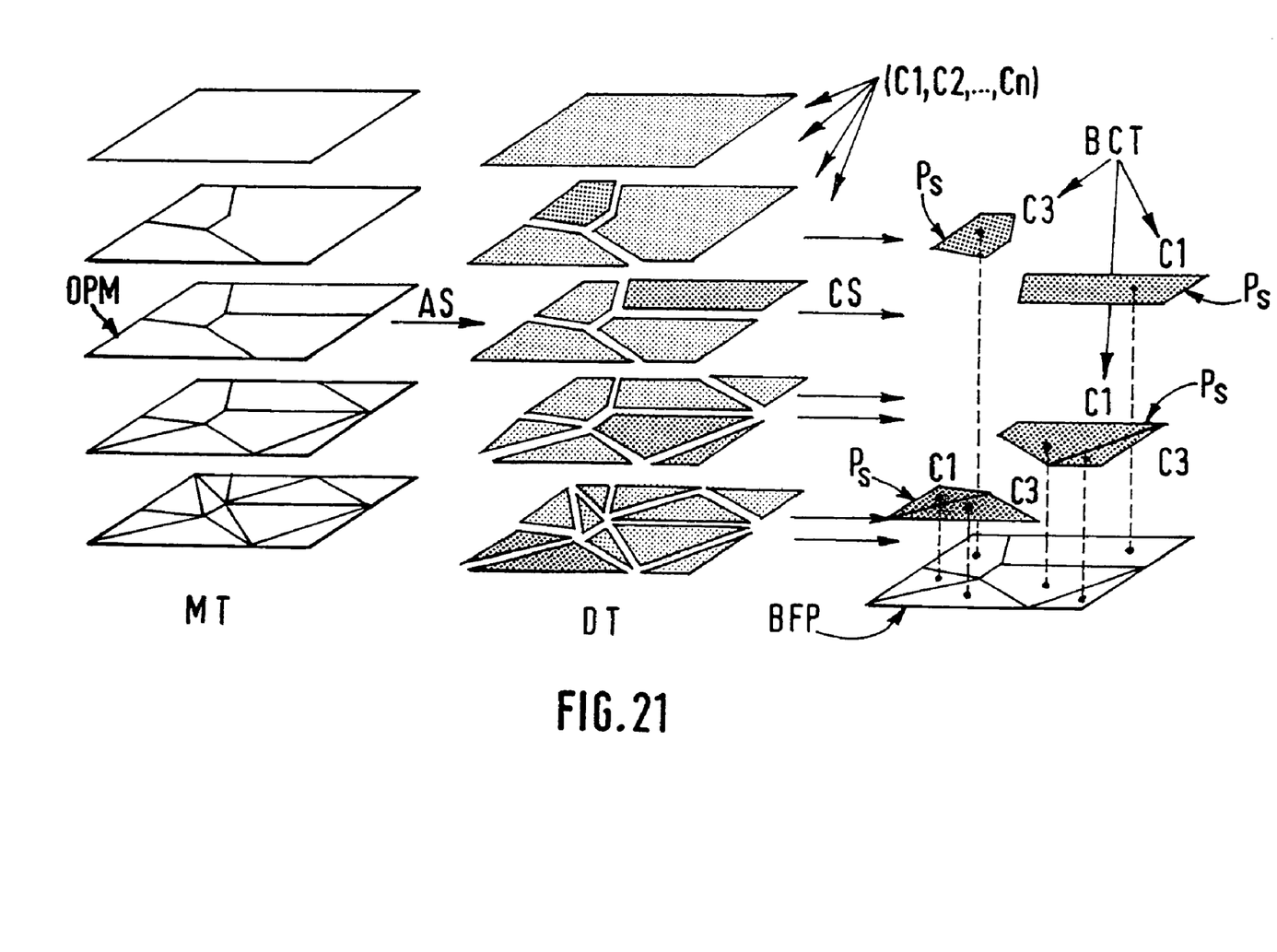
FIG. 21 shows how this mesh tree allows to make a decision on which polygons belong to the final mesh and which coding technique will be used within each region.
Figure 22:
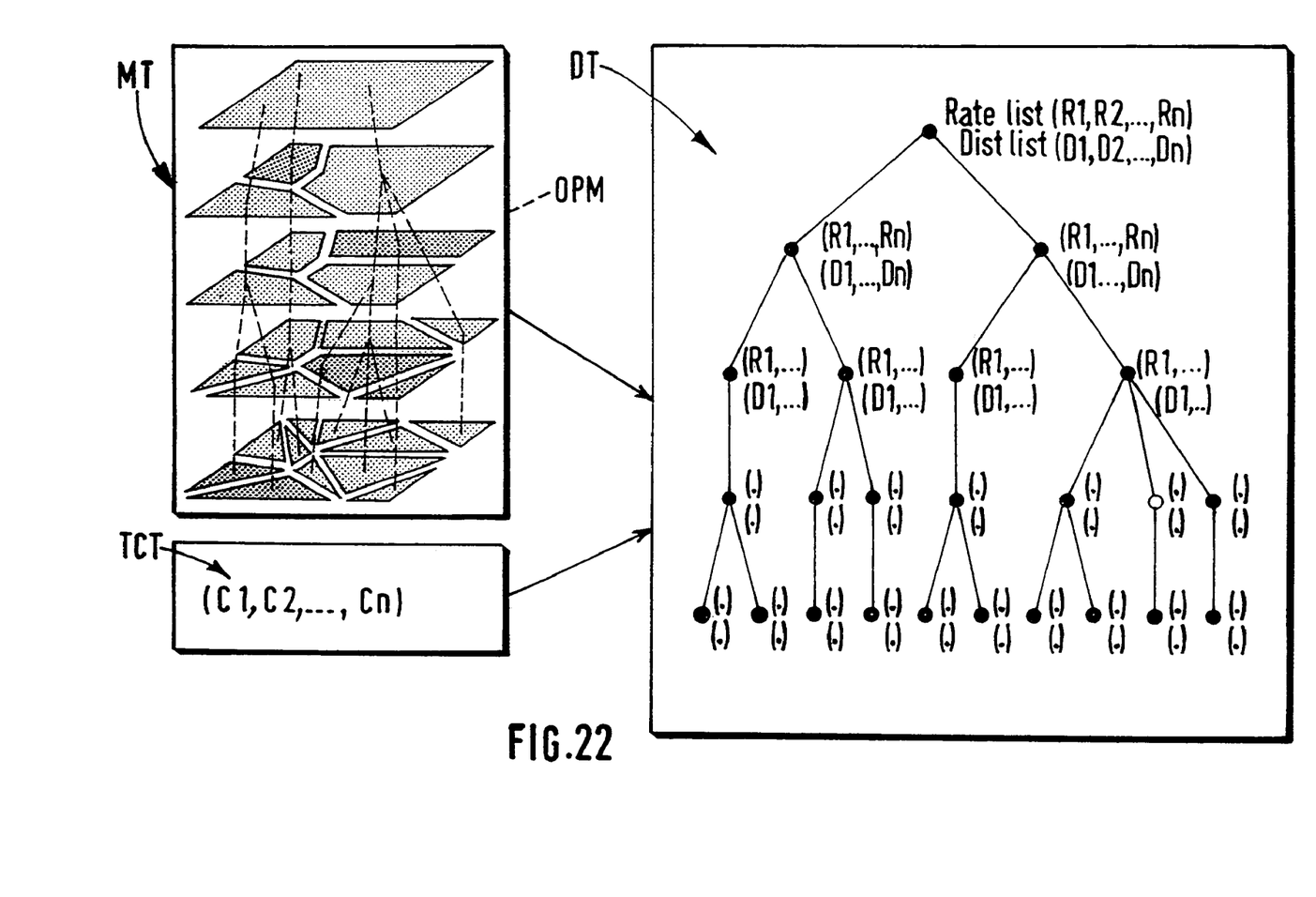
FIG. 22 shows a decision tree construction.

The illustration of the whole decision process, as implemented in the sub-assembly 192, has been given in FIG. 21. From the mesh tree MT, all regions are extracted (analysis step AS) to form the decision tree DT, and several texture coding techniques, indicated by the reference $C_1, C_2, ..., C_n$ are considered for each region. Then polygonal regions $P_S$ from various levels of the mesh tree are chosen (choice step CS), and the best final partition BFP (or optimal partition) is defined together with the best coding techniques BCT, one for each polygonal region ($C_1, C_3, ...$).

Once this optimal partition, created from the proposals contained in the mesh tree, and the coding strategy for each polygonal region have been defined, the information necessary to decode the image sequence should be sent to a receiver (or to a storage medium, the decoding process being then implemented later). This information, processed in the coding sub-assembly 193, is composed, as illustrated in FIG. 19, of the following elements:

(a) the coding strategy itself: this information, coded in a decision coding device 1931, will inform the receiving part (the receiver or the storage medium) about the coding technique to be applied on each region;

(b) the partition: a mesh coding device 1932 produces all the information needed by the receiving part for restoring the current partition, that is to say the position of each polygonal region and its contour, an identification number (or label) being also transmitted for each polygonal region in order to track it in time and to deal with areas uncovered by motion compensation;

(c) the texture parameters of each polygonal region: the texture may be coded in a texture coding device 1933 by using a very large number of conventional region-based coding schemes region-based wavelets decomposition, shape-adaptive direct cosine transform, and so on).

Finally the output signals of the devices 1931 to 1933 of the sub-assembly 193 are sent to a multiplexer 1935, the output of which constitutes a multiplexed coded output bitstream either stored or sent to a receiving system (not shown). Satisfying coding results have been obtained between 10 and 30 kbits/s.

Figure 24:
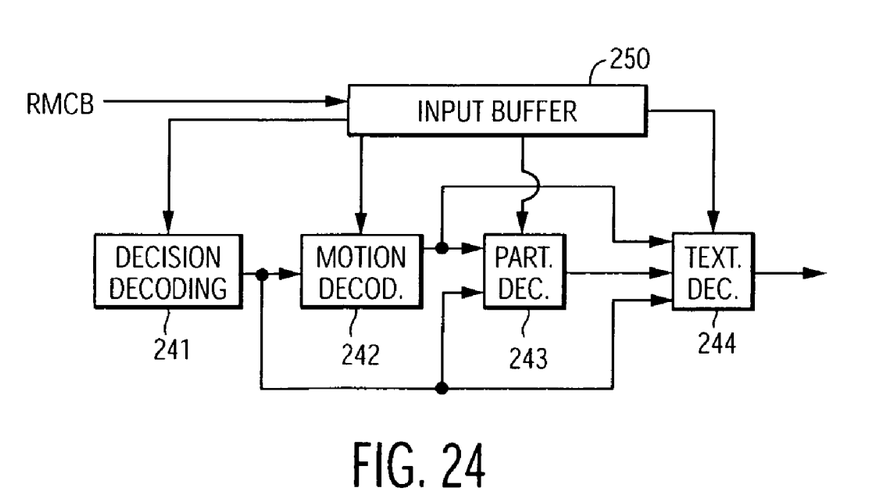
FIG. 24 is a schematic representation of a decoding system according to the invention.

In said receiving system, a decoding process allowing to reconstruct decoded pictures is carried out, the corresponding device being described with reference to FIGS. 24 to 26. The received multiplexed coded bitstream RMCB (corresponding to the bitstream sent through the transmission channel and/or towards the receiving part and/or the storage medium) is first received by an input buffer 250, and then sent to a decision decoding device 241, followed in series by a motion decoding device 242, a partition decoding device 243, and a texture decoding device 244, the output of which constitutes the output decoded signal of the decoding system (these main decoding devices correspond to the coding functions implemented in the coding sub-assembly 193 of FIG. 19). First the coding strategy information and the motion are decoded in the devices 241 and 242. Then the mesh and texture information are successively decoded in devices 243 and 244 respectively, according to FIG. 25 that illustrates the loop which allows to understand the decoding process and to FIG. 26 that shows in greater detail the mesh decoding device 243.

Concerning the mesh decoding device 243 (illustrated in FIG. 25 and shown in greater detail in FIG. 26), it receives on the one hand the output signals of the buffer 250 storing the transmitted coded signals and on the other hand the previously decoded and reconstructed partition, called REC (t−1) and available in the form of a list of labels at the output of the texture decoding device 244. Said device 243 implements the following successive steps, as illustrated in FIG. 26.

Figure 25:
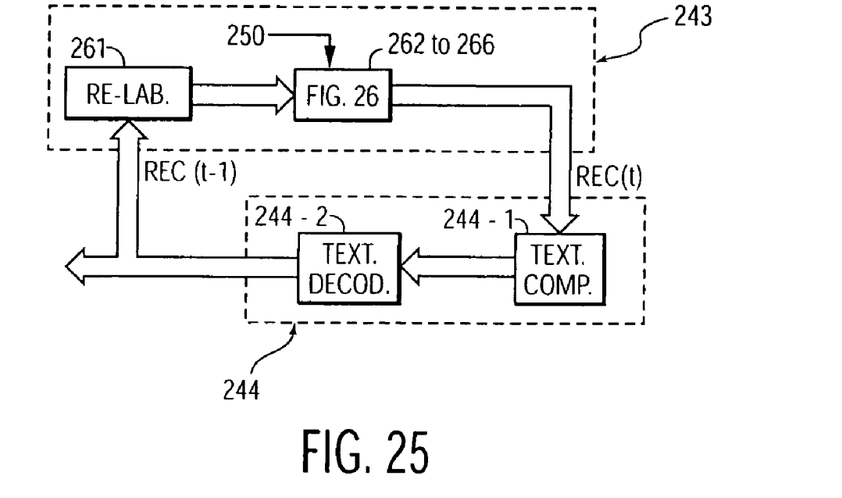
FIG. 25 is a more detailed illustration of the partition and texture decoding process.
Figure 26:
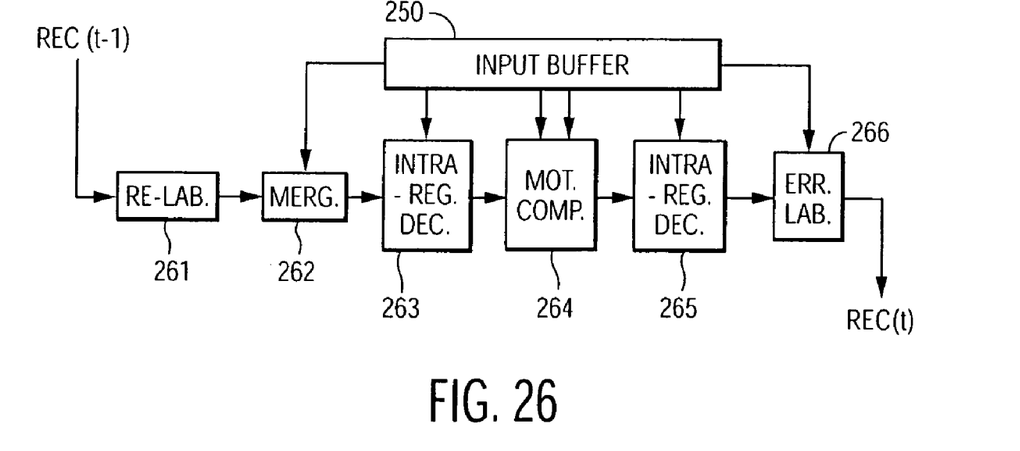
FIG. 26 is an embodiment of the partition decoding device.

The first step, implemented in a relabelling circuit 261 also shown in FIG. 25, consists in modifying the labels of the previously reconstructed partition. Such a refresh step is provided for the following reason: since some regions have been on the coding side either created or eliminated, the maximum value of the labels is increasing. The regions are then preferably relabelled in order to limit the value of label numbers, and, for technical reasons, it is simpler and more convenient to reassign a label value at the beginning of each decoding loop, in such a way that only labels 1 to N are used if there are N regions. The relabelling step then simply assigns the label "1" to the first encountered region, the label "2" to the second one, and so on.

The second step, implemented in a merging circuit 262, performs the merging orders that are contained in the buffer 250. During the third step, the regions transmitted in intra frame mode are decoded (intra regions decoding circuit 263). During the fourth step, the previously coded partition is motion compensated (motion compensation circuit 264) and the compensation errors are decoded (inter regions decoding circuit 265). The fifth and last step deals with the labelling of the decoded compensation errors partition, carried out in a decoded errors labelling circuit 266. Preferably the compensation is done exactly as it was done on the coding side: the compensation relies on the motion parameters defined for each region and, each time there is a conflict between two labels, the order information is used in view of a decision allowing to know which label will be kept. The output partition of the device 243 is the current reconstructed partition, called REC(t).

This output current partition is received by the texture decoding device 244, in which a texture compensation 244-1 is first performed (FIG. 25), and then followed by a texture decoding step 244-2. As for the coding part, in which several coding techniques had been proposed, the same methods may be used, the decoding process being similar to the coding one. The output information of the device 244 yields the decoded picture, once each polygonal region has been similarly processed.

What is claimed is:

1. A system for coding a sequence of segmented pictures defining successive partitions, each current picture being originally available in the form of mesh of blocks the nodes of which are located on high gradient points and each block being subdivided into two triangles, wherein said system comprises:
 (A) a projection circuit, for estimating on the basis of the mesh defined for a previous picture (T−1) a projected mesh made of polygons and corresponding to the current picture T;
 (B) a mesh coding circuit, for coding motion and texture associated to said projected mesh;
 (C) a texture error detection and coding circuit;
 wherein said mesh coding circuit comprises:
 (a) a mesh definition device, for associating to said projected mesh, mesh proposals including coarser meshes obtained by merging and finer meshes obtained by resegmentation;
 (b) a decision sub-assembly, for taking the mesh proposals of said mesh definition device and making a decision on which polygons will belong to a final projected mesh and which coding technique among a predetermined list will be used within each one of said polygons;
 (c) a coding sub-assembly, for coding said final projected mesh and the texture of each of said polygons belonging to said final projected mesh.

2. A system according to claim 1, wherein said decision sub-assembly comprises a decision tree construction device, said decision tree construction device being provided for conveying information about cost and quality of coding techniques, and an optimization device, for finding a set of polygons defining said final projected partition with a highest coding quality and lowest associated cost.

3. A system for decoding coded signals, said coded signals constituting for each current partition a coded information corresponding to an optimal partition composed either of regions of a main partition determined by a motion estimation and compensation of a previous partition and a temporal extension of the compensated partition or of regions of additional partitions created by merging or re-segmenting regions of the main partition, wherein said decoding system comprises a decision decoding device, provided for decoding the information corresponding to the strategy used for coding said optimal partition, a motion decoding device, a partition decoding device and a texture decoding device.

* * * * *